US011734691B2

(12) United States Patent
Muthuswamy et al.

(10) Patent No.: US 11,734,691 B2
(45) Date of Patent: Aug. 22, 2023

(54) IDENTIFYING SISTER NODES BASED ON A CONTEXT NODE

(71) Applicant: International Business Machines Corporation, Armonk, NY (US)

(72) Inventors: Srinivasan S. Muthuswamy, Bangalore (IN); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/083,449

(22) Filed: Oct. 29, 2020

(65) Prior Publication Data
US 2022/0138752 A1    May 5, 2022

(51) Int. Cl.
*G06Q 20/40* (2012.01)
*G06Q 40/08* (2012.01)
*G06Q 20/38* (2012.01)
*H04L 67/01* (2022.01)
*H04L 45/02* (2022.01)

(52) U.S. Cl.
CPC ....... *G06Q 20/4016* (2013.01); *G06Q 20/382* (2013.01); *G06Q 40/08* (2013.01); *H04L 67/01* (2022.05); *H04L 45/02* (2013.01)

(58) Field of Classification Search
CPC .... G06Q 20/4016; G06Q 40/08; H04L 67/01; H04L 45/02
See application file for complete search history.

(56) References Cited

U.S. PATENT DOCUMENTS

| 6,292,938 | B1 | 9/2001 | Sarkar et al. |
| 7,856,411 | B2 | 12/2010 | Darr |
| 9,310,864 | B1 | 4/2016 | Klein |
| 10,223,760 | B2 | 3/2019 | Ananthanpillai et al. |

(Continued)

FOREIGN PATENT DOCUMENTS

| CN | 111709472 | * | 6/2020 | ............ H04W 12/12 |
| CN | 114429351 A | | 5/2022 | |

(Continued)

OTHER PUBLICATIONS

"Patents Act 1977: Combined Search Report Under Section 17(5)(b) and Abbreviated Examination Report Under Section 18(3)", Mar. 18, 2022, Your Reference DP/P49690GB, Application No. GB2114346.6, 9 pages.

(Continued)

*Primary Examiner* — Hao Fu
(74) *Attorney, Agent, or Firm* — Daniel M. Yeates

(57) ABSTRACT

A computer-implemented method uses a context node to identify sister nodes. The method includes receiving, by a processor, input data. The input data includes a plurality of messages, each message containing a set of message data. The method further includes, generating, by a pattern detector, and based on the input data, a network graph, where the network graph includes a plurality of nodes. The method also includes selecting a first context node. The method includes determining a first pattern for the first context node. The method further includes identifying, based on the first pattern, a first sister node. The method also includes outputting, by a network interface, the first sister node and the network graph.

18 Claims, 5 Drawing Sheets

(56) References Cited

U.S. PATENT DOCUMENTS

| | | | |
|---|---|---|---|
| 10,235,430 B2 | 3/2019 | Sivakumar et al. | |
| 10,685,379 B2 | 6/2020 | Purves et al. | |
| 2014/0101724 A1* | 4/2014 | Wick | G06F 21/30 |
| | | | 726/4 |
| 2015/0381486 A1* | 12/2015 | Xiao | H04L 41/0896 |
| | | | 370/237 |
| 2018/0165111 A1 | 6/2018 | Feng | |
| 2018/0203738 A1 | 7/2018 | Banerjee | |

FOREIGN PATENT DOCUMENTS

| | | |
|---|---|---|
| DE | 102021123579 A1 | 5/2022 |
| GB | 2601227 A | 5/2022 |
| JP | 2022074072 A | 5/2022 |
| WO | 2009058042 A1 | 5/2009 |

OTHER PUBLICATIONS

Disclosed Anonymously, "Transaction Fraud Alert Consolidation Methodology for Financial Institutions", An IP.com Prior Art Database Technical Disclosure, IP.com No. IPCOM000245829D, IP.com Electronic Publication Date: Apr. 13, 2016, 7 pages.

Disclosed Anonymously, "Deep learning and Cognitive analysis based enhanced cheque validation and fraud detection", An IP.com Prior Art Database Technical Disclosure, IP.com No. IPCOM000259429D, IP.com Electronic Publication Date: Aug. 12, 2019, 6 pages.

Disclosed Anonymously, "System and Method for Identifying Populations At Risk for Fraud", An IP.com Prior Art Database Technical Disclosure, IP.com No. IPCOM000259578D, IP.com Electronic Publication Date: Aug. 23, 2019, 3 pages.

Finkler et al., Graph Analytics for Real-time Scoring of Cross-channel Transactional Fraud, Conference Paper, Research Gate, Feb. 2016, 19 pages.

Jiang et al., "Anomaly Detection with Graph Convolutional Networks for Insider Threat and Fraud Detection", Chinese Academy of Sciences, printed Sep. 14, 2020, 6 pages.

Akoglu et al., "Graph based Anomaly Detection and Description: A Survey", Department of Computer Science, Stony Brook University, Stony Brook, NY, printed Sep. 14, 2020, 68 pages.

Liu et al., "Graph Analysis for Detecting Fraud, Waste, and Abuse in Health-Care Data", Copyright © 2016, Association for the Advancement of Artificial Intelligence, Summer 2016, 14 pages.

Muthuswamy et al., "System and Method To Detect and Define Activity and Patterns On a Large Relationship Data Network", U.S. Appl. No. 16/824,932, filed Mar. 20, 2020.

* cited by examiner

IDENTIFYING SISTER NODES BASED ON A CONTEXT NODE

BACKGROUND

The present disclosure relates to network graphs, and, more specifically, automatically identifying a hotspot in a network graph.

There is a need for monitoring transactions and activity of account holders at institutions to detect any fraudulent or criminal activity. Detecting activity indicative of fraudulent or criminal activity is increasingly difficult due to the involvement of a large amount of information, such as multiple transactions, large numbers of parties, and ease of performing the transactions.

SUMMARY

Disclosed is a computer-implemented method to use a context node to identify sister nodes. The method includes receiving, by a processor, input data, wherein the input data includes a plurality of messages, each message containing a set of message data. The method further includes, generating, by a pattern detector, and based on the input data, a network graph, wherein the network graph includes a plurality of nodes. The method also includes selecting a first context node, wherein the first context node includes a first characteristic. The method includes determining a first pattern for the first context node. The method further includes identifying, based on the first pattern, a first sister node that includes the first characteristic. The method also includes outputting, by a network interface, the first sister node and the network graph. Further aspects of the present disclosure are directed to systems and computer program products containing functionality consistent with the method described above.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Data Processing System in General

Figure 1:
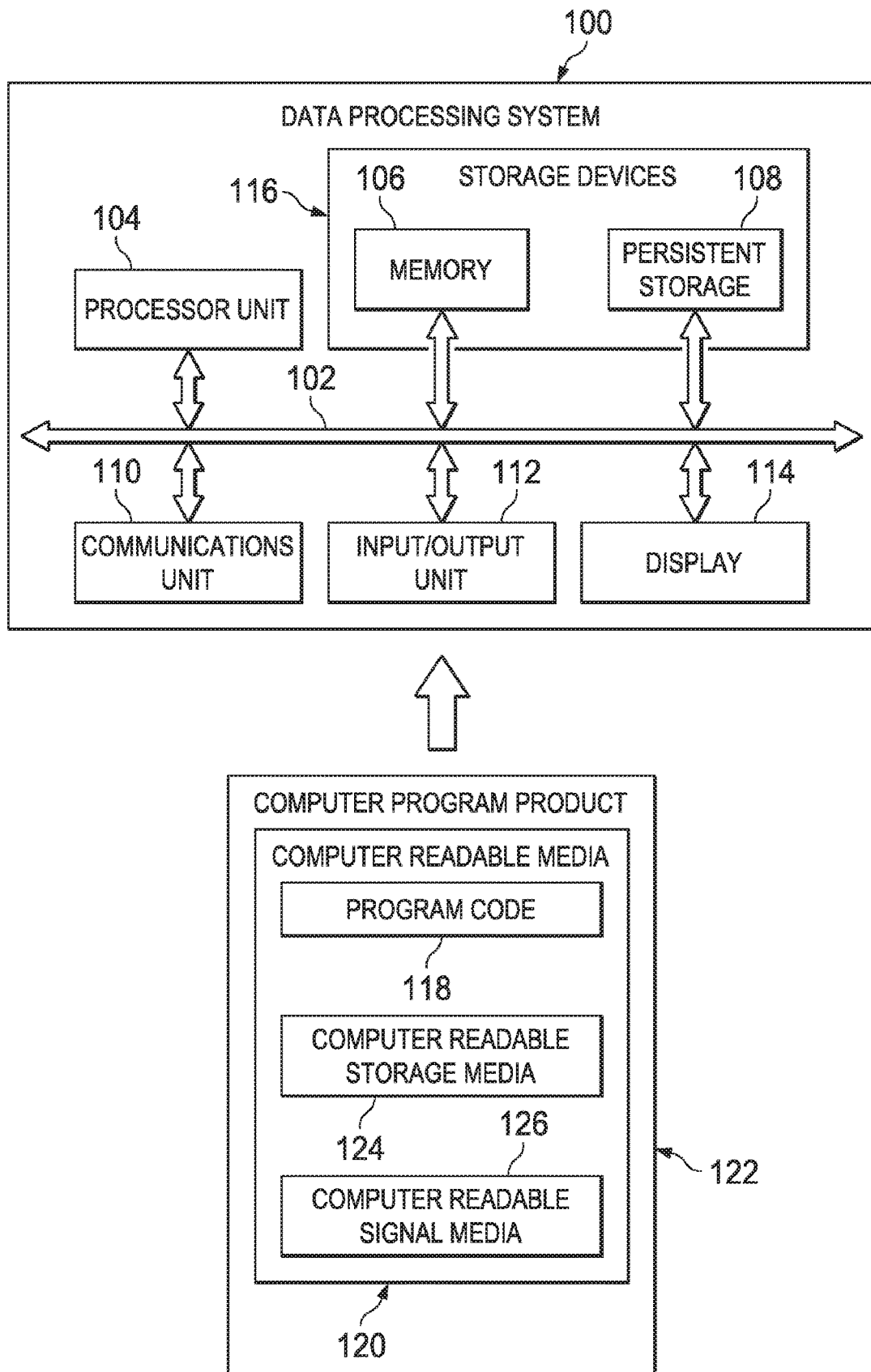
FIG. 1 is a block diagram of a DPS according to one or more embodiments disclosed herein.

FIG. 1 is a block diagram of an example data processing system (DPS) according to one or more embodiments. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

There is a need for monitoring transactions and activity of account holders at various institutions to detect any improper activity, which may include any or all of fraudulent, criminal, and unauthorized activity. Detecting improper activity is increasingly difficult due to the involvement of a large amount of information, such as multiple financial transactions, large numbers of parties, and ease of performing the transactions.

Positive identification of a fraudulent transaction and/or a party involved in fraudulent activity can provide insights into methods, strategies, organizations, locations, etc. that can be used to detect and reduce other instances of fraud. Embodiments of the present disclosure seek to use one instance of fraudulent activity, to identity similar cases of fraudulent activity, after analyzing characteristics and patterns of the identified instance and searching for those patterns and characteristics in different scenarios.

The present disclosure is directed to a system and method to use a context node to identify sister nodes (or mirror nodes) in a network graph. A sister node can be any node that has at least one common characteristic as the context node and/or is in the relative location of a pattern as the context node.

For purposes of this disclosure, the terms relationship network, relation graph, graph and network graph are used interchangeably. A context node can be any node in the network graph that has been identified as relevant for any fraudulent purpose in the network graph. For example, if the network graph represents a web of financial transactions, then the context node can represent a party that is involved in money laundering. Another example, if the network graphs represents digital message traffic, the context node can represent a computing device that is a source of phishing messages. A third example, if the network graph represents generation of experimental data, the context node can represent a manipulated data set. For purposes of this disclosure fraudulent activity (an activity related to the context node), can be any activity that is contrary to societal norms, laws, regulations, policy, and the like.

Embodiments of the present disclosure can create a relationship network (or network graph, or graph), (e.g., a large-scale relationship network), and/or define and detect data patterns on the relationship network, (e.g., the graph). In some embodiments, the systems and methods include ingesting data, and processing the data to form a relationship network or data network comprising a plurality of nodes and the relationships between the nodes. In some embodiments, the system and method include selecting data desirous of being detected by a user, seeding a pattern detection module with a configuration and definitions for the desired data pattern for detection, running the pattern detection module to pass messages through the relationship network, and implementing an insights module to aggregate messages and generate insights. In one or more embodiments, the system and method capture data patterns and activity in a uniform manner to create a large relationship network or graph and run message propagation techniques to detect data patterns.

The network graph can include a plurality of nodes, where each node is indicative of an individual unit as defined by the graphs (e.g., bank account, person, geographic location, computing device, business entity, etc.). In some embodiments, a context node is identified in the network graph. The context node can be any node in the network graph that has been identified as relevant in the network graph (e.g., a bank account identified as a pass through for money laundering, data theft, hacking, etc.). The identified patterns can be patterns related to the context node.

The system and method in one or more embodiments can capture and detect different data patterns indicative of the context node. In some embodiments, the system uses the patterns and/or surrounding of the context node to identify one or more sister nodes in a different portion of the network graph and/or in a different network graph.

In some embodiments, each context node can be a type of node. There can be a predefined number of potential types. Each type can be based on a type of network graph. For example, a network graph for a computer network can have different types of nodes than a network graph for financial transaction network graph.

The aforementioned advantages are example advantages, and embodiments exist that can contain all, some, or none of the aforementioned advantages while remaining within the spirit and scope of the present disclosure.

Figure 2:
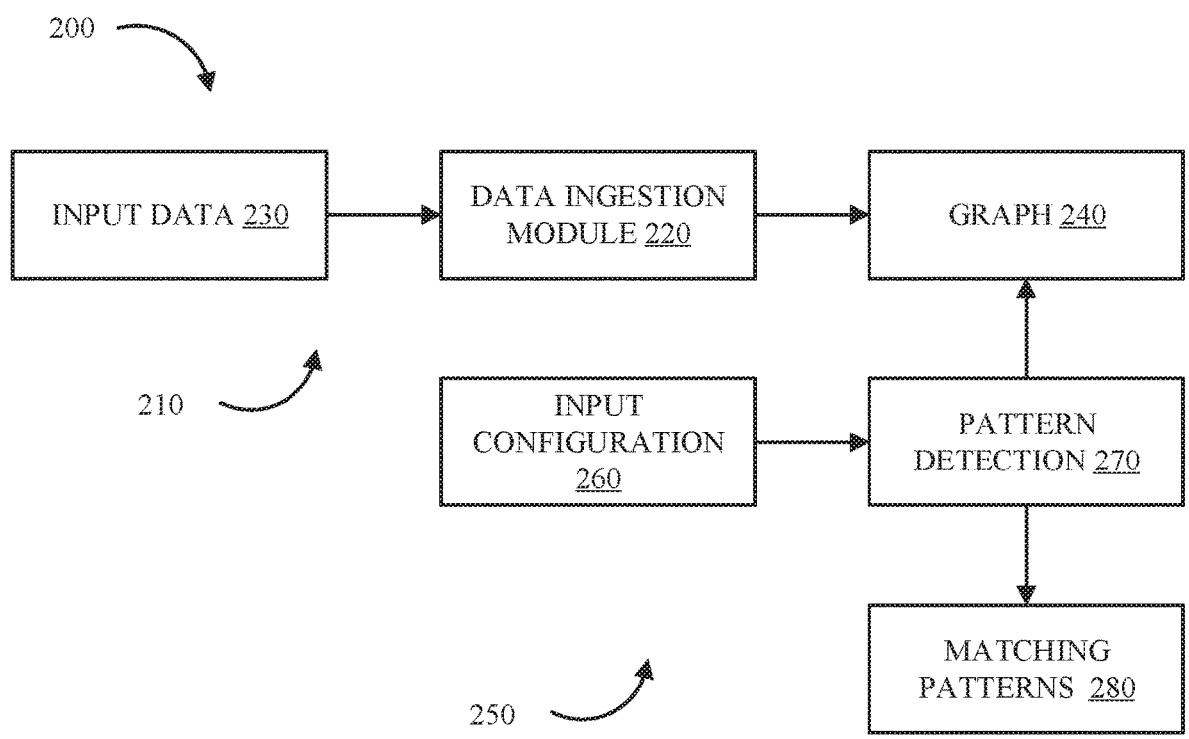
FIG. 2 depicts a block diagram of an embodiment of a system for processing data, including creating a relationship network, defining and detecting data patterns according to one or more embodiments disclosed herein.

FIG. 2 illustrates a block diagram of an embodiment of a system and method to create a large relationship network or graph, and/or define and detect different data patterns in the relationship network, and/or collect and aggregate insights based upon the relationship network. In some embodiments, system 200 operates on one or more systems consistent with DPS 100. In a first part 210 of system 200, data ingestion module 220 reads input data 230 and creates graph 240. Graph 240 in one or more embodiments is a large-scale relationship network, also referred to as a data network. The data ingestion module 220 includes circuitry and/or logic to receive the input data 230 and process the data to output graph or network graph 240. The system 200 is particularly adapted to define and/or detect data patterns in the relationship network indicative of suspicious activity typically associated with fraud, money laundering, data manipulation, phishing attempts, and/or other criminal or unethical activity. In one or more embodiments, the input data 230 comprises parties, accounts, transactions, etc. For example, where a financial institution, such as a bank, desires to determine if there is a money laundering scheme or other fraud, for example as a result of governmental oversight, or regulations, such as anti-money laundering (AML) laws, the input data 230 can comprise: the transactions occurring with or being processed by the financial institution; the parties to any financial transaction with or through the financial institution; and account information (the customers) of the financial institution. In the case of an insurance organization and the like, the input data 230 can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing a motor vehicle, physician treating patient, etc. The examples above are not limiting and there can be other situations where the system 200 will have applications, and additional or other input data can be provided.

The input data 230 is input into the data ingestion module 220 which outputs as a network graph 240. The data ingestion module 220 contains circuitry and/or logic to receive input data 230 and process the data to create the network graph 240. In most instances, large amounts of data are input and processed by the data ingestion module 220, and the network graph 240 is a large-scale network graph 240. The network graph 240 includes, for example, objects and relationships. Objects, for example, can be people, accounts, policies, etc. The transactional or relationship network graph 240 from processing input data 230 of a financial institution would include, for example, parties, party-account relationships, account-account transactional relationships, and party-party relationships.

Referring again to FIG. 2, the second part 250 of the system 200 includes input configuration module 260 and pattern detection module 270 for matching data patterns 280. The input configuration module 260 sets up the system to detect desired data patterns indicative of activity or behavior in the transaction network. The input configuration module 260 contains circuitry and/or logic to receive the input configuration 265 from the user, and process and/or transmit information and data to the pattern detection module 270. A user inputs input configuration 265 into the system 200, and in particular the second part 250 of the system, vis-à-vis the input configuration module 260 so that the system knows the type of data patterns indicative of suspicious activity or behavior that the system 200, and in particular the second part 250 of the system 200, will search for and detect. That is, the user defines (through the input configuration module 260) the type of matching data pattern 280 the system 200 should detect, and in particular the type of matching data pattern 280 the second part 250 (e.g., the pattern detection module 270) of the system 200 should search for in the relationship network or graph 240. The pattern detection module 270 reads data from the network or graph 240 and detects matching data patterns 280 of behavior or activity in the network graph 240 as defined by the input configuration selected and input by the user. The pattern detection module 270 contains circuitry and/or logic to receive input configuration data from input configuration module 260, receive relationship network data, process the input configuration and the network graph 240 to detect data patterns, and, in one or more embodiments, create insights, including in an aspect aggregating, and applying the insights to the network graph 240.

Figure 3:
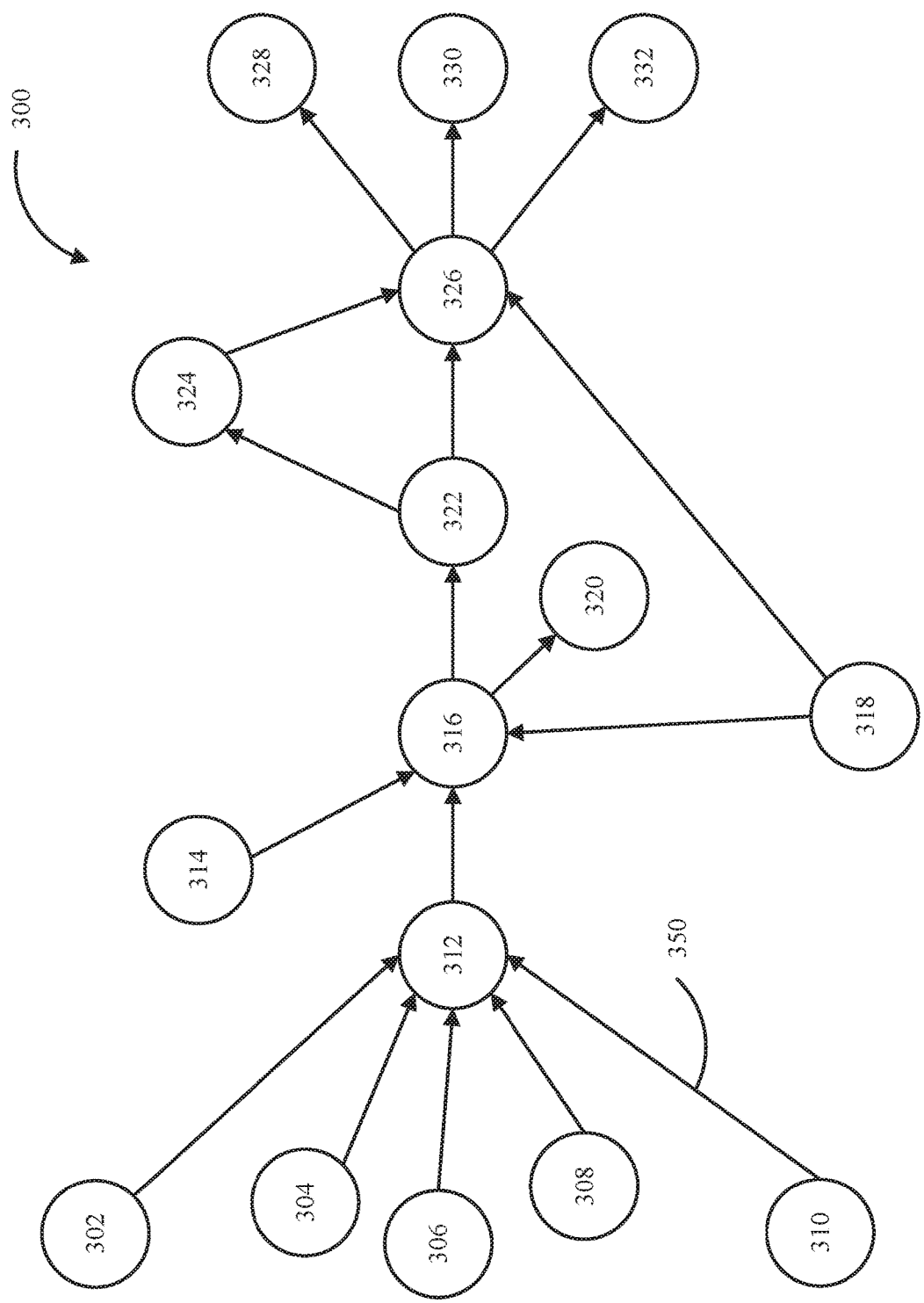
FIG. 3 is an illustration of an embodiment of a network graph according to one or more embodiments disclosed herein.

FIG. 3 illustrates an example of a full (or a portion of) a network graph 300 (e.g., graph 240) produced by the data ingestion module 220. In some embodiments, the network graph is based upon input data 230 of a computer service center, financial institution or an insurance institution. It can be appreciated that the relationship network or graph 240 typically will include much more data and be of a much larger scale than illustrated in FIG. 3 and/or include additional nodes not shown in FIG. 3. FIG. 3 includes a plurality of nodes, 302, 304, 306, 308, 310, 312, 314,316, 318, 320, 322, 324, 326, 328, 330, and 332. Each node represents unique unit. The unit can be an account, an institution, a person, an area, a computer, a server, a user, and the like. Links 350 show a relationship between the nodes connected by the link. (e.g., a map of a pattern of a transaction flow, relationship between each party, etc.). Links 350 in FIG. 3 include an indication direction (e.g., data flow, money flow, sender and receiver, etc.). In some embodiments, the indicator does not necessarily mean that message traffic in unidirectional, messages can travel opposite of the indicated direction. The directional indicator can represent a majority of message traffic. The directional indicator can be change based on a different portion or a different view of network graph 300. In some embodiments, links 350 do not indicate a direction, rather indicate any link between the two nodes.

In various embodiments, the network graphs can include nodes of a variety of categories. In some embodiments, a decoy node is a category of nodes. The decoy node is intentionally inserted into a process (e.g., money transfer flow) to obscure a suspicious pattern. Node 324 can be an example of a decoy node. For a financial transaction can be routed through node 324 in route to node 326 to avert suspicion of the link between node 322 and node 326. In some embodiments, a fan-in node is a category of nodes. A fan-in node can be any node that is a target of more than one sender. In network graph 300 node 312 can be a fan-in node. A fan-in node features in include the aggregate amount of data (e.g., cash, data, etc.) transferred into the node, the number of sending nodes (e.g., node 302-310), time period for fan-in to occur, and type of transaction/message. In some embodiments, a fan-out node is a category of nodes. A fan-out node can be any node that sends messages/transactions to two or more target nodes. A fan-out node can include the same characteristics as the fan-in node, except reversed for sending vice receiving. For example, node 316 and node 326 can be fan out nodes. In some embodiments, a broker node can be a category of nodes. A broker node can be any node that is located in between a fan-in node and a fan-out node. The broker node can pass the message received from the fan-in node (even if not directly received from the fan-in node) and send, through any number of hops, to a fan-out node. For example, nodes 316, node 322, and node 326 can be broker nodes.

A node category can be generalized across multiple types of network graphs, (e.g., computing network graph, financial transaction network graph, insurance claim network graphs, etc.) while a node type is specific to the type of network graph. For example a fan-in node may be present in both computer network graphs and financial transaction network graph, but the fan-in node in a computing network graph can be of a hub type node, while the fan-in node in the financial transaction network graph can be one of a target or mediator.

Figure 4:
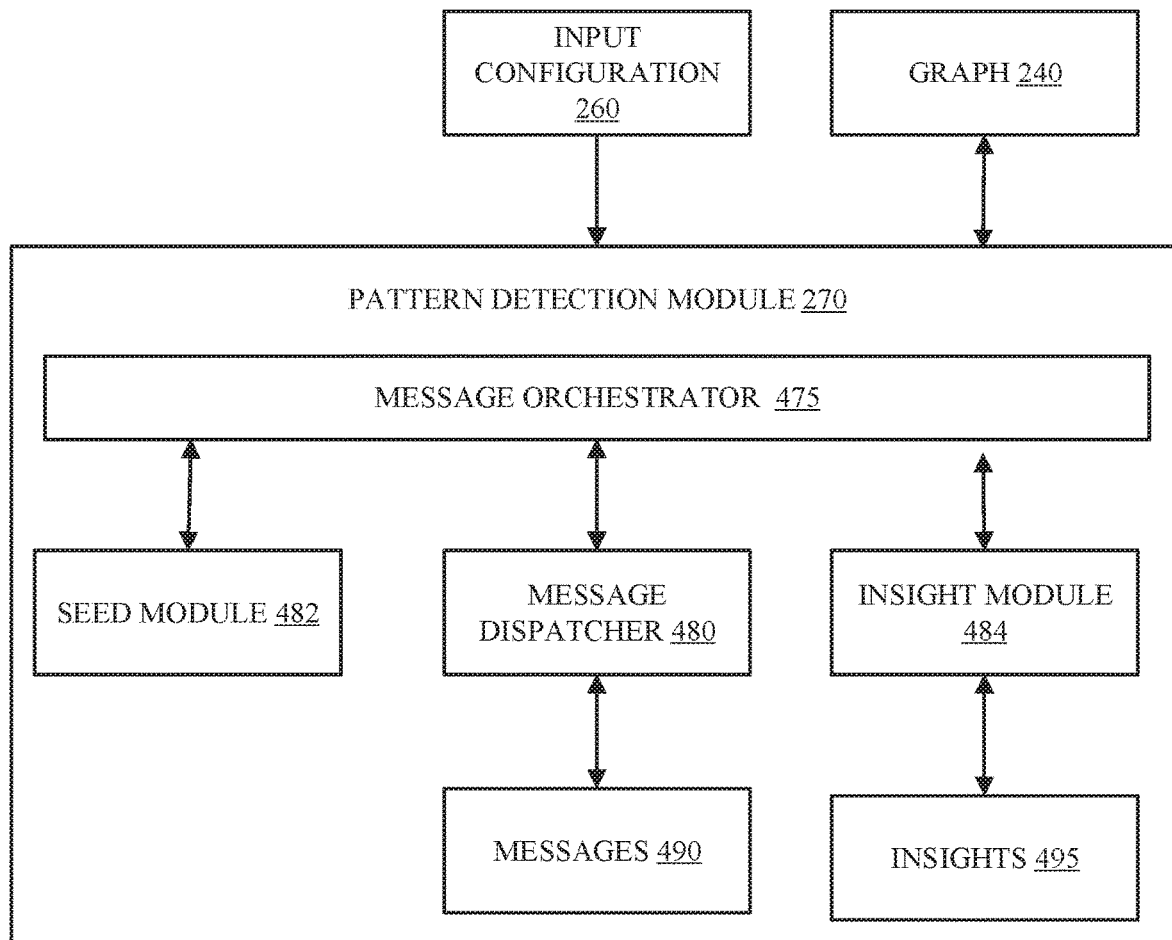
FIG. 4 depicts a block diagram of an embodiment of a pattern detection module according to one or more embodiments disclosed herein.

FIG. 4 illustrates an embodiment of pattern detection module 270. To illustrate pattern detection module 270, but not to limit embodiments, FIG. 4 is described within the context of FIG. 2. Where elements referred to in FIG. 4 can be consistent with elements shown in FIG. 2, the same reference numbers are used in both figures.

Pattern detection module 270 in one or more embodiments includes a message orchestrator 475, a seed module 482, a message dispatcher 480, and an insights module 484. Pattern detection module 270 in an aspect also includes a message repository 490 and an insights repository 495. The message orchestrator 475 contains circuitry and/or logic to control the seed module 482, the message dispatcher 480, and the insights module 484, and to invoke the modules for detecting matching data patterns 280 in the network or graph 240. As an overview, the message orchestrator 475 receives the input configuration 260, which instructs the message orchestrator 475 on the type of matching data pattern 280 to detect and the criteria, filters, and/or rules to apply during data pattern detection. The message orchestrator 475 calls the seed module 482 and, in an embodiment, passes the input configuration onto, or defines the input configuration for, the seed module 482. The seed module 482 contains circuitry and/or logic to generate, initialize, or initiate the seed messages, which in an embodiment are sent to the message repository 490. After transmitting the messages to the message repository 490, seed module 482 gives control back to the message orchestrator 475. The message orchestrator 475 then involves the message dispatcher 480 which contains circuitry and/or logic to read the messages and dispatch each message to its target receiver as defined by the criteria, filter and/or rules selected by input configuration 260. The message dispatcher 480 propagates and dispatches all messages until there are no more messages in the message repository 490 to process. The message dispatcher 480 also maintains the message repository 490. The message dispatcher 480 propagates the messages by reading the network/graph 240 and forwarding, saving, and/or terminating the messages according to the criteria, filters, and/or rules defined and selected by input configuration 260. The messages that meet the criteria defined by the system (based upon the input configuration) are saved by the insights module 484 as insights in the insights repository 495. The insights module 484 contains circuitry and/or logic to maintain and save the insights in the insights repository 495. The message orchestrator 475 calls the insights module 484 to aggregate the insights saved in the insights repository 495, and in one or more embodiments saves and/or applies the insights to the graph 240. The message orchestrator 475, the seed module 482, the message dispatch 480, and the insights module 484 all contain circuitry and/or logic to perform their recited functions.

The seed module 482, based upon input configuration 260 received by the message orchestrator 475, generates or prepares the initial seed messages. The messages, including the initial seed messages, contain and identify information based upon the type of pattern to be detected and the criteria, filters, and/or rules selected through the input configuration 260 and implemented by the seed module 482 and the message dispatcher 480. The information identified and/or contained in a (propagated) message, including an initial seed message, can contain: original sender data/identifier; sender data/identifier; receiver data/identifier; target receiver data/identifier; date/time data; trace data; and score (other transaction data). The trace data is the path taken through the network graph 240 from the initiator or seed node (the original sender) to the receiver node. The information identified in the seed message is updated as the message is forwarded and propagated in the relationship network.

When the seed module 482 prepares the initial seed messages, the "original sender" (e.g., 305 A) is identified in the network graph 240 and is referred to as the initiator or seed node. The seed module 482, based upon the input configuration 260 and the relationship network graph 240, runs a filter, such as for example applying the rules or criteria selected as input configuration data, to identify all the seed or initiator nodes. The seed module 482 also in one or more embodiments identifies the "sender", which in the case of the initial messages is the same as the "original sender". The seed module 482 also in an embodiment identifies the "receiver" and the "target receiver". A "sender" who is not the same as the "original sender" can have first been a "receiver" and subsequently forward the message to become a "sender" (or "additional sender"). The "receiver" is the particular node that receives the message and can be a party object or an account object. To determine the "receiver" the seed module 482 in an aspect looks at the relationship data of the initiator or seed node from the relationship network or graph 240, and from the relationship network graph 240 the seed module 482, identifies all the nodes to which the initiator node is directly connected. The seed module 482 generates or prepares the initial messages based upon the nodes to which the initiator or seed node is directly connected. That is, in one or more embodiments, for each node that the initiator or seed node is directly connected, the seed module 482 creates one initial message. If the initiator or seed node is directly connected to four (4) nodes for example, then in an embodiment four (4) initial messages are created. The seed module 482, when creating the initial messages, identifies the initiator or seed node as the "original sender" and the directly connected node as the "receiver." The "target receiver" is the object type, e.g., a party or account node/object or any other type of object that is supposed to carry the propagated risk.

The seed module 482 also sets forth the trace or the pathway for the initial message 505. The seed module 482 also sets or assigns the weight score to be associated with the relationship between the nodes based upon the input configuration 260. That is, the weight or score is set by the user, and may be set by the type of activity being searched for in the network. These initial messages need to be sent to and/or stored in the message repository 490 so the seed module 482 involves the message dispatcher 480 to send the initial message(s) to the message repository 490 and the initial messages are sent to and stored in the message repository 490. Control is then turned back from the seed module 482 to the message orchestrator 475.

The system 200 has now been initialized with the initial seed messages generated and stored in the message repository 490, and the message orchestrator 475 has control. The message orchestrator 475 calls the message dispatcher 480 to propagate the initial messages through the network graph 240 and detect certain matching data patterns 280. The message dispatcher 480 looks at the message repository 490 and reads the initial message(s). The message dispatcher 480 reads the messages for a given node, and: (a) if the given object/node is the receiver node and if the reach factor (which is a measure of the degree of relationship with the initiator node) is reached, then the message is archived (stored) as an insight in the insights repository 495; (b) if the given object/node is the receiver node, but the reach factor is not reached, then the message is archived (stored) as an insight in the insights repository 495 and the message is forwarded in the network graph 240; and (c) if the given object/node is a pass-through node, then the message is forwarded in the network graph 240 and no insights are saved to the insights repository 495. In one or more embodiments, the message is forwarded to the immediate surrounding directly connected nodes as determined from the relationship network graph 240. In an aspect, and according to the input configuration, the message(s) are not forwarded to a node that forms a loop. That is, in an embodiment, a message whose trace or pathway forms a loop where it is propagated or forwarded to the same node more than once is deemed invalid and is not undertaken or performed by the message dispatcher 480 (or system 200). In a different aspect, and according to the input configuration, the messages are permitted to form a loop. To save insights to the insights repository 495, in one or more embodiments, the message dispatcher 480 invokes the insights module 484 to save the message to the insights repository 495. In one or more embodiments the insights can be saved on a node basis. The reach factor, also referred to as the relationship degree, is the number of receiver nodes in the pathway or trace to connect back to the initiator or seed node. The reach factor or relationship degree in one or more embodiments is programmable and variable, and can be input by a user when setting the input configuration 260 for the system 200, or more particularly the second part 250 of the system 200.

The message dispatcher 480 fetches the first initial message or seed message from the message repository 490, and, based upon the information in the initial message: saves the initial or seed message to the insights repository 495 as described above; terminates the initial message based upon the reach factor; and/or forwards the seed message in the relationship network as a propagated message based upon the reach factor and/or whether the receiver node is a pass through node as defined in the system. For any seed or initial message that is to be forwarded as a propagated message, all the nodes directly connected to the receiver node of the seed message are identified in the relationship network graph 240 and the seed message is forwarded to those directly connected nodes as a propagated message.

For each propagated message, if the directly connected node is: (a) within the reach factor, the propagated message is saved and is propagated in the relationship network graph 240; (b) at the reach factor, the propagated message is saved as an insight and is not forwarded in the relationship network graph 240 (i.e., the propagated message is terminated); and (c) a pass-through node, the propagated message is forwarded in the network graph 240. This process of determining the directly connected nodes and forwarding the propagated message in the relationship network graph 240 is continued until the propagated message is fully propagated and forwarded and has no more valid, directly connected nodes (e.g., the propagated message is beyond the reach factor, or, in one of more embodiments, the pathway or trace of the propagated message forms a loop). As the seed messages and propagated messages are propagated through the relationship network graph 240, the information contained in the messages in one or more aspects changes and is updated.

The message dispatcher 480 propagates the messages through the network graph 240 until each message is fully propagated (e.g., beyond the reach factor determined by the input configuration 260). The message dispatcher 480 propagates each message through the network graph 240 until no more messages are left in the system (i.e., the message repository 490). When all the messages are processed and propagated through the network graph 240, control from the message dispatcher 480 goes back to the message orchestrator 475. The message orchestrator 475 can invoke the insights module 484 to collect insights (e.g., the messages saved to the insight repository 495). In one or more embodiments, the insights module 484 looks at all the archived messages saved to each node in the insights repository 495 and generates insights for each node. In an aspect, if the aggregate function is selected, the messages saved to the insight repository 495 are aggregated by the condition (e.g., one degree of relationship difference, or two degree of relationship difference), and scores are accumulated, for example, on a node-by-node basis. In one or more embodiments, the message orchestrator 475 receives the insights, e.g., the saved messages, from the insights module 484 and adds the insights or portions thereof to the network or graph 240. The insights and the manner of saving the insights can vary with the system and the pattern that is desired to be detected. The input configuration 260 in one or more aspects permits the input criteria, the insights to be collected, and how such insights will be presented and/or transmitted to the end user, to be varied.

It is contemplated that the system will be updated with additional input data over time. For example, after a first run of the system and method, a bank, financial institution, insurance organization, etc., could periodically, for example daily, monthly, bi-yearly, etc., update the system with additional data. In one or more embodiments, the system detects updates to the network graph 240 as a new object/node added, a new relationship added, an existing relationship updated, an object/node deleted, or a relationship deleted. The system in one or more embodiments will review the traces and determine which paths need to be redone, e.g., re-propagated, or where there are new paths to be traversed. The system and method in one or more embodiments can be updated, and, in an embodiment, a trace is used to determine one or more paths needed to recreate the message propagation in the relationship or data network to obtain updated insights based upon new updated data or to determine any new path that needs to be traversed because of the new data. The system when performing the update will initiate the propagation, add updates to the archives, and re-run the insights module on the impacted nodes where updates are added to the insights repository and insights are regenerated.

Figure 5:
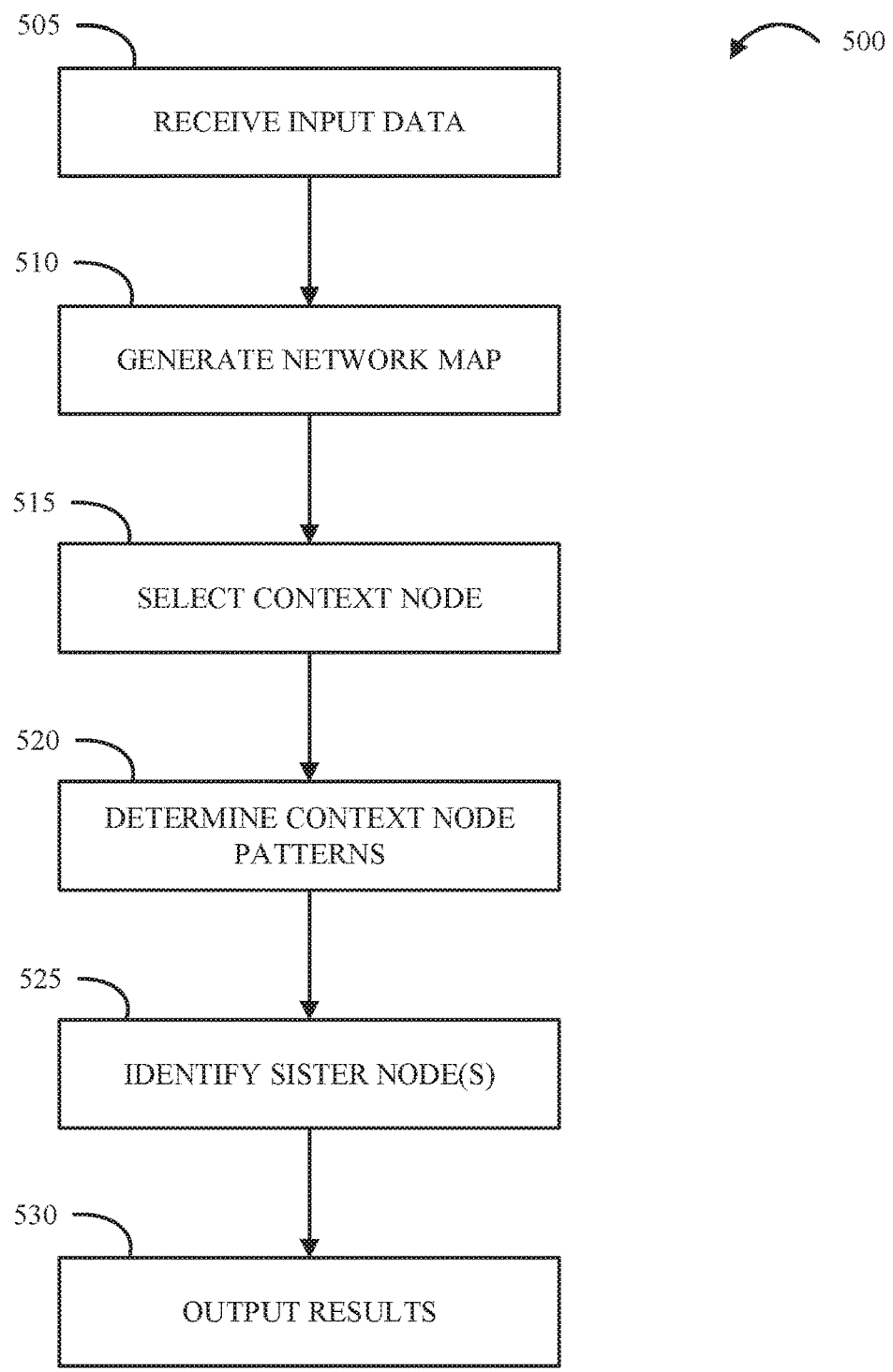
FIG. 5 illustrates a flow chart of an example method to identify sister nodes based on a context node in a network graph according to one or more embodiments disclosed herein.

FIG. 5 is an example flowchart in accordance with at least one embodiment of the present disclosure illustrating and describing a method for using a context node to identify one or more sister nodes. While the method 500 is described for the sake of convenience and not with an intent of limiting the disclosure as comprising a series and/or a number of steps, the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

The method 500 includes, at 505, receiving input data. In some embodiments, the input data includes message data (or transaction data). In some embodiments, the input data is received as input data 230. The message data can include all relevant data for each message. For example, if the input data can include financial transactional information, parties to financial transactions, account numbers involved in the transactions, amounts and times of the transactions, customers of the transactions, and originating and final location of the transactions (e.g., transfers), can be included with the message. Another example, the input data can include other transactional information, such as, for example, insurance transactional information. A third example, the input data can include messages in a computing network, each computing device is a node, and the network graphs represents network traffic.

In some embodiments, the input data includes input configuration criteria. The configuration criteria inform the system what data patterns to detect in the relationship network and, in one or more embodiments, what criteria, filters, and/or rules to use when detecting data patterns and/or hotspots in the relationship network.

The method 500 includes, at 510, generating one or more network graphs (e.g., graph 240, network graph 300). In some embodiments, generating the network map includes: detecting data patterns in the relationship network or graph; and/or includes, in one or more aspects, receiving a user-provided input configuration to the system. The input configuration informs the system what data patterns to detect in the relationship network and, in one or more embodiments, what criteria, filters, and/or rules to use when detecting data patterns in the relationship network. In some embodiments, the network map includes one or more nodes and connections between the nodes. Each node can represent an account, a user, an organization, or something similar. The connections can represent relationships, such as transaction between the two nodes, and/or other connections (e.g., both use a common bank).

The method 500 includes, at 515, identifying a context node. A node that has characteristics desirous to be discovered in different nodes can be a context node. In some embodiments, the characteristic can be a node category (e.g., fan in node, fan out node, etc.). In some embodiments, the characteristic can be based on the pattern of the network graph. In some embodiments, the node type can be based on an identifier. (e.g., person or account represented by the node, type of computing device, a data generation event, etc.). In some embodiments, the context node is identified by a user. The user can view a visual display of the network. In some embodiments, identification can be based on a user analyzing the network graph. In some embodiments, the identification is based on the context node being correlated to fraudulent activity. In some embodiments, an input is received from a user, where the input includes the context node and/or a node type.

In some embodiments, the context node is identified as a node type. The node type can be selected from a predetermined set of types. The predetermined set of types can any number of types. In some embodiments, the set of types can be based on a context of the network graph. For example, if the network graph represents financial transactions and is configured to identify money laundering, the set of nodes can be figure in a money laundering scheme. One example set of types can be source, a target, and a meditator. Another example, if the network graph is related to insurance claims, the set of types could include a claimant, a beneficiary, a policy holder, and an agent.

In some embodiments, identifying the context nodes includes identifying one or more decoy nodes in the network graph. In some embodiments, the user can select the decoy nodes. In some embodiments, the decoy nodes are removed from the network graph in response to being selected. In some embodiments, the decoy nodes remain in the network graph, however the subsequent analysis ignores the decoy nodes (e.g., the pattern is detected without the decoy node).

The method 500 includes, at 520, determining at least one pattern for the context node. In some embodiments, the pattern is determined by analyzing the context node in the context of the network graph. In some embodiments, the pattern is based on the number the nodes to which the context node is connected, the number of secondary nodes, a node category (e.g., fan-in node, fan-out node, broker node, etc.) message flow direction (e.g., unidirectional, bidirectional, etc.) and/or other node characteristics (e.g. message size, geographic location, etc.). A secondary node can be a node that is within n hops of the context node, where n can be determined as part of the pattern and/or predefined. The number of secondary nodes analyzed can be based on the node type and/or the graph type. In some embodiments, the analysis ignores any nodes marked as decoy nodes. In some embodiments, the identified patterns are displayed to the user. The user can add and/or remove decoy nodes and re-analyze the context node. In some embodiments, two or more different patters can be identified for a single context node.

The method 500 includes, at 525, identifying one or more sister nodes. A sister node can be any node that is equivalently located within the determined patterns. For example, in the context of network graph 300, assume node 316 is the context node, and the determined pattern can be any node that is a target of node 318. Node 326 would be identified as a sister node of node 316. In some embodiments, identifying sister nodes includes running a message propagation algorithm (as previously discussed) to identify similar patterns. In some embodiments, the sister nodes can be identified in the same network graphs and/or a different network graph.

The method 500 includes, at 530, outputting results. This can include displaying the one or more sister nodes, and the one or more determined patterns. In some embodiments, the output includes displaying the network graph with the one or more patterns indicated (e.g., highlighted) on the network graph. In some embodiments, the output includes displaying the sister nodes in the context of their network graphs. In some embodiments, the output can include notifying (e.g., an alarm, an email notification, etc.) the user that a hotspot has been identified.

An example of the overall process will be discussed assuming network graph 300 represents a financial transaction network graph. Each node can represent a party, and each link 350 represents a direction of money transfer. A financial transaction network graph can have four relevant node types: a source; a target; a mediator; and a beneficiary. First, after inputting the data, network graph 300 is generated. Node 316 can be identified as the context node of a mediator type. In some embodiments, node 324 can be marked as a decoy node. In this instance it can increase the number of hops between node 316 and the ultimate destinations of node 328, node 330, and node 332. Marking node 324 as a decoy node can cause the analysis to treat all transaction that pass through node 324 as being a single hop between node 322 and node 326. Next, analysis is performed and one or more patterns determines surrounding node 316. In some embodiments, network graph 300 can be the pattern located within a larger network graph. A first determined pattern can be the broker node within one hop of a fan-in node (e.g., node 312) and within two hops of a fan-node out (e.g., node 326). A second determined pattern can include a broker node in a series of at least two consecutive broker nodes. The second pattern can include additional features such a common number of transactions and a common amount of money that pass through each broker node. Some other examples of patterns can be based on the source, whether direct or indirect, the amount of money passing through, the amount of time the money is held by the node, and other similar factors.

Next, the message propagation algorithm could be run on different section of the network graph and/or a second financial transaction next work graph. Based on the first pattern node 322 can be identified as a sister node. It is within one hop of fan-in node 316 (e.g., target of node 312, node 314, and node 318), and within one hop of fan-out node 326. Based on the second pattern, node 324 can be a sister node. It can be in a series with node 322 and node 316. Last, these sister nodes, and any other potentially identified sister nodes can be displayed to the user.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a processor, input data, wherein the input data includes a plurality of messages, each message containing a set of message data;
generating, by a pattern detector, and based on the input data, a network graph, wherein the network graph includes a plurality of nodes including a decoy node;
selecting a first context node of the plurality of nodes, wherein the first context node includes a first characteristic and the first context node is relevant to a fraudulent purpose;
identifying the decoy node in the first network graph;
removing the decoy node from the first network graph;
determining a first pattern for the first context node, wherein the first pattern ignores the decoy node and the first pattern represents a relationship between the first context nodes and the remaining plurality of nodes;
running a message propagation algorithm, wherein the message propagation algorithm includes creating a plurality of propagation messages and sending each propagation message from a seed node to each directly connected node, and continuing propagation of each propagation message until no more valid connected nodes can be found;
identifying, in response to running the message propagation algorithm and based on the first pattern, a first sister node including the first characteristic, wherein the first sister node is in a common relative position of the context node within the first pattern; and
outputting, by a network interface, the first sister node and the network graph, wherein the output includes displaying the network graph.

2. The method of claim 1, the method further comprising:
identifying the first context node as a first node type; and
receiving, from a user, a first input, wherein the first input includes the first context node; and
wherein, the selecting the first context node and the identifying the first node type is in response to receiving the first input.

3. The method of claim 2, wherein the network graph is identified by a graph type, and the first node type is included in a set of node types and the set of node types is correlated to the graph type.

4. The method of claim 3, wherein the graph type is a financial transaction network graph.

5. The method of claim 3, wherein the set of node types includes at least: a source node, a target node, and a mediator node.

6. The method of claim 2, wherein the determining of the first pattern comprises:
analyzing a path for each message of the plurality of messages that passes through the first context node.

7. The method of claim 6, wherein the first input includes a decoy node.

8. The method of claim 1, wherein identifying the first sister node further comprises:
determining, in response to running the message propagation algorithm, that the first sister node is located at a relative position within the first pattern equivalent the context node in the first pattern.

9. The method of claim 1, wherein the first sister node is identified in the first network graph.

10. The method of claim 1, wherein the first sister node is identified in a second network graph.

11. The method of claim 1 wherein each message includes a financial transaction.

12. The method of claim 1, wherein each message includes an insurance claim.

13. A system comprising:
a processor; and
a computer-readable storage medium communicatively coupled to the processor and storing program instructions which, when executed by the processor, are configured to cause the processor to:
receive, input data, wherein the input data includes a plurality of messages, each message containing a set of message data;
generate, by a pattern detector, and based on the input data, a network graph, wherein the network graph includes a plurality of nodes including a decoy node;
select a first context node of the plurality of nodes, wherein the first context node includes a first characteristic and the first context node is relevant to a fraudulent purpose;
identify the decoy node in the first network graph;
remove the decoy node from the first network graph;
determine a first pattern for the first context node, wherein the first pattern ignores the decoy node and the first pattern represents a relationship between the first context node and the remaining plurality of nodes;
run a message propagation algorithm, wherein the message propagation algorithm includes creating a plurality of propagation messages and sending each propagation message from a seed node to each directly connected node, and continuing propagation of each propagation message until no more valid connected nodes can be found;

identify, in response to running the message propagation algorithm and based on the first pattern, a first sister node including the first characteristic, wherein the first sister node is in a common relative position of the context node within the first pattern; and output by a network interface, the first sister node and the network graph by a network interface, the first sister node and the network graph, wherein the output includes displaying the network graph.

14. The system of claim 13, wherein the program instructions are further configured to cause the processor to:

identify the first context node as a first node type; and receive, from a user, a first input, wherein the first input includes the first context node; and wherein, the selection of the first context node and the identification of the first node type is in response to receiving the first input.

15. The system of claim 14, wherein the determination of the first pattern comprises:

analyzing a path for each message of the plurality of messages that passes through the first context node.

16. A computer program product, the computer program product comprising a computer readable storage medium having program instructions embodied therewith, the program instructions executable by a processing unit to cause the processing unit to:

receive, input data, wherein the input data includes a plurality of messages, each message containing a set of message data;

generate, by a pattern detector, and based on the input data, a network graph, wherein the network graph includes a plurality of nodes including a decoy node;

select a first context node of the plurality of nodes, wherein the first context node includes a first characteristic and the first context node is relevant to a fraudulent purpose;

identify the decoy node in the first network graph;

remove the decoy node from the first network graph;

determine a first pattern for the first context node, wherein the first pattern ignores the decoy node and the first pattern represents a relationship between the first context node and the remaining plurality of nodes;

run a message propagation algorithm, wherein the message propagation algorithm includes creating a plurality of propagation messages and sending each propagation message from a seed node to each directly connected node, and continuing propagation of each propagation message until no more valid connected nodes can be found;

identify, in response to running the message propagation algorithm and based on the first pattern, a first sister node including the first characteristic, wherein the first sister node is in a common relative position of the context node within the first pattern; and output by a network interface, the first sister node and the network graph by a network interface, the first sister node and the network graph, wherein the output includes displaying the network graph.

17. The computer program product of claim 16, wherein the program instructions are further configured to cause the processing unit to:

identify the first context node as a first node type; and receive, from a user, a first input, wherein the first input includes the first context node and the first node type;

wherein, the selection of the first context node and the identification of the first node type is in response to receiving the first input.

18. The computer program product of claim 17, wherein the determination of the first pattern comprises:

analyzing a path for each message of the plurality of messages that passes through the first context node.

* * * * *